(12) United States Patent
Chen et al.

(10) Patent No.: US 9,045,139 B2
(45) Date of Patent: Jun. 2, 2015

(54) INTUITIVE ECO-DRIVING ASSISTANCE METHOD AND SYSTEM

(71) Applicant: AUTOMOTIVE RESEARCH & TESTING CENTER, Lugang Chen, Changhua Hsien (TW)

(72) Inventors: Yu-Sung Chen, Changhua Hsien (TW); Yi-Feng Su, Changhua Hsien (TW); Shung-Huang Chen, Changhua Hsien (TW); Yu-Long Chang, Changhua Hsien (TW); Chia-Hao Yang, Changhua Hsien (TW)

(73) Assignee: AUTOMOTIVE RESEARCH & TESTING CENTER, Lugang Chen, Changhua Hsien (TW)

( * ) Notice: Subject to any disclaimer, the term of this patent is extended or adjusted under 35 U.S.C. 154(b) by 302 days.

(21) Appl. No.: 13/722,424

(22) Filed: Dec. 20, 2012

(65) Prior Publication Data

US 2014/0176321 A1  Jun. 26, 2014

(51) Int. Cl.
*B60Q 1/00* (2006.01)
*B60W 30/14* (2006.01)
*B60W 50/14* (2012.01)
*B60W 30/18* (2012.01)

(52) U.S. Cl.
CPC ............... *B60W 30/14* (2013.01); *B60W 50/14* (2013.01); *B60W 30/18163* (2013.01); *B60W 2420/403* (2013.01); *B60W 2550/10* (2013.01); *B60W 2550/12* (2013.01); *B60W 2550/22* (2013.01); *B60W 2550/302* (2013.01)

(58) Field of Classification Search
CPC .......... Y02T 10/48; G08G 1/166; G08G 1/16; G02D 2200/0625; F02D 2200/501; F02D 2200/603; F02D 2200/606; F02D 41/042; F02D 41/123

USPC ............... 340/435, 436, 437, 425.5
See application file for complete search history.

(56) References Cited

U.S. PATENT DOCUMENTS

| | | | |
|---|---|---|---|
| 8,116,971 B2 * | 2/2012 | Chen et al. ............ | 701/123 |
| 2008/0294339 A1 * | 11/2008 | Tauchi et al. .......... | 701/212 |
| 2009/0091439 A1 * | 4/2009 | Sekiyama et al. ..... | 340/459 |
| 2009/0143934 A1 * | 6/2009 | Motonaga et al. ..... | 701/29 |
| 2009/0271087 A1 * | 10/2009 | Motonaga ............. | 701/102 |
| 2010/0259374 A1 * | 10/2010 | Matsuo et al. ........ | 340/439 |
| 2011/0054768 A1 * | 3/2011 | Sullivan ................ | 701/123 |
| 2012/0010797 A1 * | 1/2012 | Luo et al. .............. | 701/70 |
| 2012/0306635 A1 * | 12/2012 | Sato ..................... | 340/425.5 |
| 2013/0158795 A1 * | 6/2013 | Hahne .................. | 701/36 |
| 2013/0253750 A1 * | 9/2013 | Otake ................... | 701/22 |
| 2013/0325306 A1 * | 12/2013 | Caveney et al. ....... | 701/117 |

* cited by examiner

*Primary Examiner* — George Bugg
*Assistant Examiner* — Edny Labbees
(74) *Attorney, Agent, or Firm* — patenttm.us (57) ABSTRACT

An intuitive eco-driving assistance system is mounted on a vehicle and has an input module, a control module and an output module. The control module is electrically connected to the input module and the output module. The output module acquires images ahead of the vehicle and speed signals for the control module to recognize a speed limit, traffic lights and a speed and distance of any obstacle on the images. Furthermore, according to the driving limits of the road and actual vehicle speed, the output module prompts for an eco-driving instruction and the speed limit meeting the road condition visually or audibly. Accordingly, the issue of conventional vehicles being structurally complicated and costly for conserving energy, only passively prompting fuel consumption, and consuming more fuel can be solved without requiring any additional and complicated system.

8 Claims, 11 Drawing Sheets

INTUITIVE ECO-DRIVING ASSISTANCE METHOD AND SYSTEM

BACKGROUND OF THE INVENTION

1. Field of the Invention

The present invention relates to an eco-driving assistance system and more particularly to an intuitive eco-driving assistance system directly prompting drivers to save energy according to road conditions.

2. Description of the Related Art

Nowadays, vehicles consuming gas all face problems of skyrocketing fuel cost and increasingly strict exhaust emission standards. Hence, without exception, every car manufacturer aggressively develops new technique seeking to increase the utilization efficiency of gas and to reduce the exhaust emission of vehicles.

In this regard, latest techniques can be generally classified into two types, namely, one type of techniques focusing on improvement on manufacturing techniques of vehicles and the other type focusing on providing prompt notices to remind drivers of their fuel-wasting driving behaviors.

Although the type of techniques pertinent to improvement on manufacturing techniques of vehicles, such as engine systems with high combustion efficiency, low energy-consuming transmission system, lightweight materials for building vehicle body, hybrid gas-electric cars, kinetic energy recovery systems under braking, idle stop/start systems and the like, can reduce the fuel consumption and exhaust emission upon driving or at idle, the overall fuel consumption and exhaust emission of vehicles are still unsatisfactory if driving behaviors of drivers run counter to the rules of energy-saving operation, and the complication and production cost of vehicles is increased.

On the other hand, although the type of techniques providing prompt notices to remind drivers of their fuel-wasting driving behaviors, such as prompting drivers for instantaneous fuel consumption of vehicles and warning of high fuel-consuming driving behaviors through acquisition of vehicle body signals, engine signals, dynamic signals and analysis of driver's behavior model, allows drivers to be aware of current fuel-consuming condition of vehicles, suggestion or rearrangement in response to traffic conditions on the road fail to be immediately and accurately performed. In other words, drivers can receive the prompts only after the occurrence of fuel-wasting behaviors. Hence, such fuel-wasting driving behaviors still keep happening throughout the driving process. Besides, when a driver accelerates the car to overtake another car, it may trigger a false warning for a high fuel-consuming driving behavior.

As disclosed in China Patent Application No. CN200910191113 entitled "Vehicle safety and fuel conservation control assistance prompting system and method", the prior art is characterized in that multiple vehicular sensors, such as steering angle sensor, throttle position sensor, brake sensor, slope sensor, acceleration sensor and the like, mounted on the vehicle body for a CPU to receive the signals of all sensors, analyze drivers' behaviors with dynamic signals of vehicle body and provide drivers instructions on how to turn the steering wheel and step on the accelerator pedal. The vehicle is structurally complicated arising from many sensors mounted thereon. As only passively receiving information of those sensors, the prompting system is unable to provide instruction for conserving fuel according to actual road condition.

From the foregoing, with improvement on manufacturing techniques of vehicles and prompt for drivers' fuel-wasting driving behaviors, fuel waste and exhaust emission of conventional vehicles can be partially reduced. However, the tradeoff is the requirement of multiple sensors mounted on vehicles to detect the states of vehicles, which causes the issue of structural complication and overall cost buildup. Additionally, the fuel-wasting conditions of conventional vehicles still depend on driving behaviors of drivers, and their fuel-wasting behavior prompting device can only passively provide fuel-wasting prompts according to road conditions and fails to immediately respond to road conditions and adjust the fuel-wasting driving behaviors of drivers. Therefore, the fuel-wasting drawback still exists.

SUMMARY OF THE INVENTION

An objective of the present invention is to provide an intuitive eco-driving assistance method and system combining detection of road condition, vehicle speed signals and obstacle to prompt for eco-driving instructions.

To achieve the foregoing objective, the intuitive eco-driving assistance method has steps of:

acquiring images of road and environmental conditions ahead of a vehicle.

recognizing traffic signs and signals on the images;

detecting any obstacle ahead of the vehicle and analyzing the obstacle;

converting the traffic signs and signals and the analyzed information of the obstacle into a mode of eco-driving behavior;

generating a prompt message corresponding to the mode of eco-driving behavior.

To achieve the foregoing objective, the intuitive eco-driving assistance system has an input module, a control module and an output module.

The input module has an image-capturing unit and a vehicle body signal capturing unit. The image-capturing unit takes images of roads or environment ahead of the vehicle and outputs image signals. The vehicle body signal capturing unit is adapted to acquire at least one speed signal of the vehicle.

The control module is electrically connected to the input module, receives the image signals from the image-capturing unit and the at least one speed signal from the vehicle body signal capturing unit, and has a traffic signal and sign recognition unit, an obstacle detection and analysis unit and an eco-driving logic unit.

The traffic signal and sign recognition unit recognizes a speed limit and traffic lights of the roads or environment.

The obstacle detection and analysis unit detects information of any obstacle ahead of the vehicle.

The eco-driving logic unit prompts multiple optimal eco-driving instructions according to the at least one speed signal, the speed limit and the detected information of obstacle acquired from the traffic signal and sign recognition unit and the obstacle detection and analysis unit, and multiple driving modes preset in the eco-driving logic unit and corresponding to the speed limit and the detected information of the obstacle.

The output module is electrically connected to the control module and has a display unit and a prompt unit respectively serving to display and prompt the eco-driving instructions or the speed limit with voice.

Given the foregoing intuitive eco-driving assistance system and method, the image-capturing unit captures the images of the roads or environment ahead of the vehicle and outputs the image signals, the vehicle body signal capturing unit acquires the vehicle speed signals, the control module acquires the image signals and the vehicle speed signals, the traffic signal and sign recognition unit recognizes the speed limit and the traffic lights of the road, the obstacle detection and analysis unit recognizes if there is any obstacle ahead of the vehicle or detects a speed and distance of the obstacle, the eco-driving logic unit prompts multiple optimal eco-driving instructions according to the at least one speed signal, the speed limit and the detected information of obstacle acquired from the traffic signal and sign recognition unit and the obstacle detection and analysis unit, and multiple driving modes preset in the eco-driving logic unit and corresponding to the speed limit and the detected information of the obstacle, and the output module provides a visual warning or audible prompt for eco-driving instructions or driving limitations suitable for current road condition. Accordingly, the present invention requires no expensive and complicated system to solve the problem of conventional vehicles being structurally complicated and costly for conserving energy, only passively prompting fuel consumption and consuming more fuel.

Another objective of the present invention is to provide an intuitive eco-driving assistance system having active control over vehicle speed. To achieve the objective, the intuitive eco-driving assistance system further has an active control unit. The active control unit is electrically connected to the accelerator of the vehicle and a brake circuit. According to signals of the eco-driving instructions or the driving limits on the road outputted from the eco-driving logic unit, the active control unit controls the accelerator and the brake of the vehicle to avoid the issue of increasing fuel consumption due to fast acceleration.

Other objectives, advantages and novel features of the invention will become more apparent from the following detailed description when taken in conjunction with the accompanying drawings.

DETAILED DESCRIPTION OF THE INVENTION

Latest literatures have pointed out that the following four conditions should be met to ensure driving behaviors with optimal energy-saving effect.

1. Drive a car at constant speed and do not quickly accelerate or decelerate at will to prevent the engine from running at a high speed range, and the saved energy can reach 5~33% (information from US Department of Energy).

2. Classify driving speed into high driving speed and low driving speed. Drive at an optimal high driving speed about 90 kilometers/hour and at an optimal low driving speed (urban area) about 50 kilometers/hour, and the saved energy can reach 7~23% (information from US Department of Energy).

3. Gently accelerate and avoid more fuel consumption arising from quick acceleration during vehicle starting, and the saved energy can reach 23~20% (information from US Environmental Protection Agency).

4. Ease off accelerator in advance and smoothly slow down speed until the vehicle is fully stopped when stopping at traffic lights and slowly re-start the vehicle after idling, and the saved energy can reach 62% (Information from Formosa Petrochemical Corp.)

From the foregoing, to achieve the driving behaviors with the optimal energy-saving performance, it is critical to determine traffic conditions ahead of vehicles beforehand, and unnecessary acceleration and deceleration can be avoided and the vehicle speed can be maintained at low speed to reduce fuel consumption.

Figure 1:
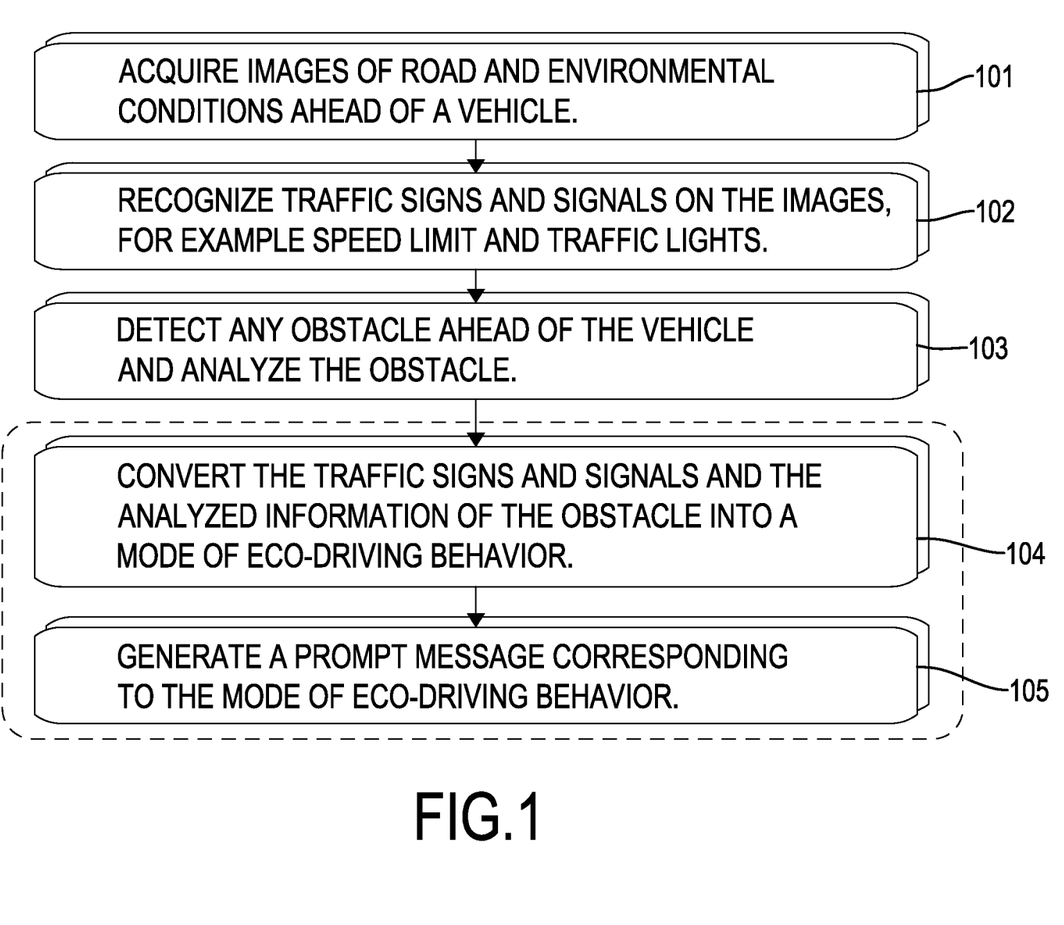
FIG. 1 is a flow diagram of an intuitive eco-driving assistance method in accordance with the present invention.

To satisfy the foregoing conditions, the present invention proposes basic concepts of a solution. With reference to FIG. 1, an intuitive eco-driving assistance method in accordance with the present invention has the following steps.

Step 101: Acquire images of road and environmental conditions ahead of a vehicle.

Step 102: Recognize traffic signs and signals on the images, for example speed limit and traffic lights.

Step 103: Detect any obstacle ahead of the vehicle and analyze the obstacle.

Step 104: Convert the traffic signs and signals and the analyzed information of the obstacle into a mode of eco-driving behavior.

Step 105: Generate a prompt message corresponding to the mode of eco-driving behavior.

According to the foregoing method, correct eco-driving behaviors or habits can be provided to vehicle drivers. Besides, the present invention can be incorporated into existing vehicle drive recording system without additionally mounting complicated sensor and detection system. Hence, the problem of high cost and structural complexity of conventional vehicles for conserving energy can be tackled, and correct eco-driving behavior can be immediately provided in response to road conditions to achieve the fuel-saving effect.

Figure 2:
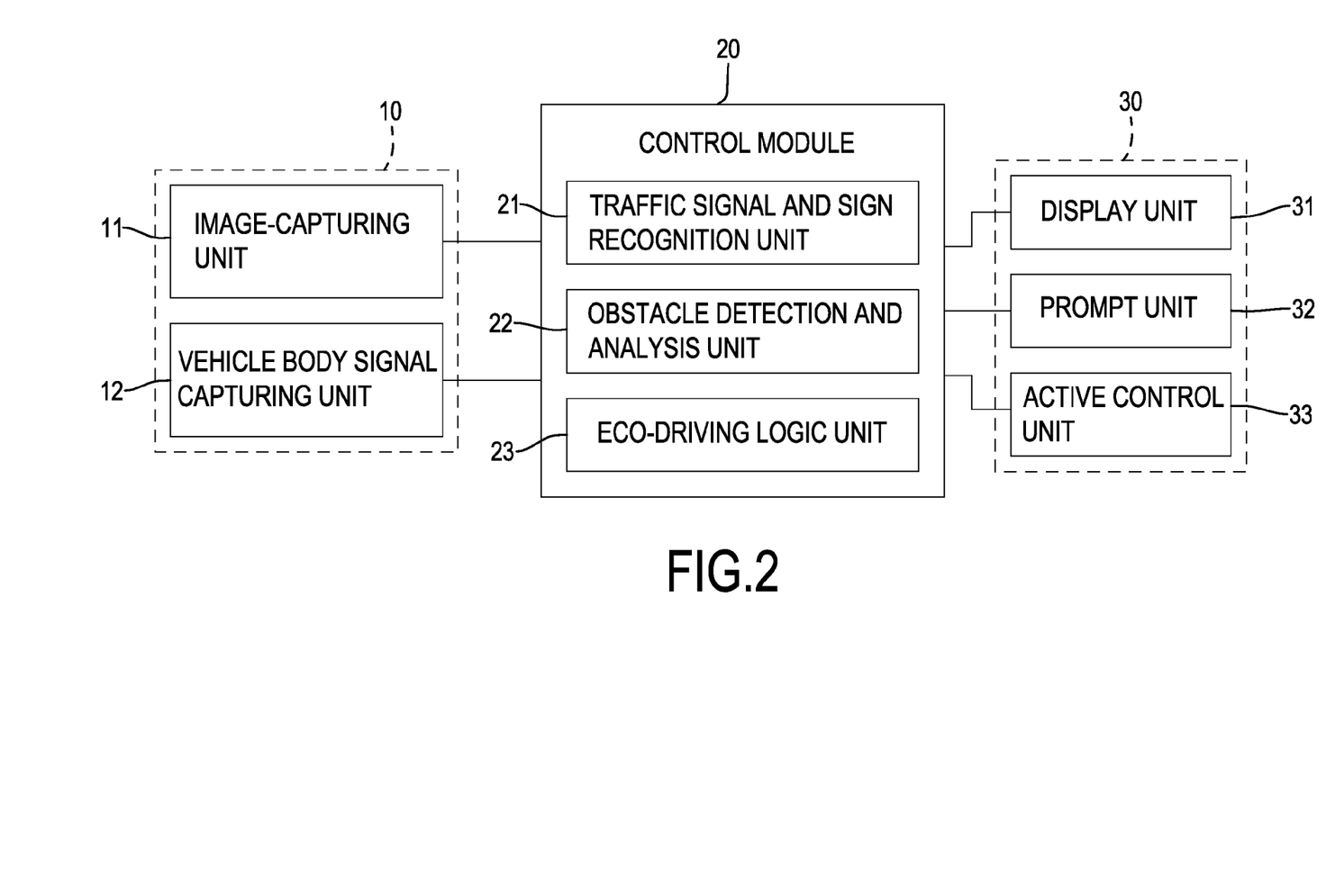
FIG. 2 is a functional block diagram of an intuitive eco-driving assistance system in accordance with the present invention.

With reference to FIG. 2, an intuitive eco-driving assistance system in accordance with the present invention is mounted on a vehicle and has an input module 10, a control module 20 and an output module 30. The control module 20 is electrically connected to the input module 10 and the output module 30.

The input module 10 has an image-capturing unit 11 and a vehicle body signal capturing unit 12. The image-capturing unit 11 is a video recorder for taking images of roads or environment ahead of the vehicle and outputting the image signals. The vehicle body signal capturing unit 12 is connected to each sensor mounted on the vehicle to acquire at least one speed signal of the vehicle, such as speed or acceleration of the vehicle.

The control module 20 is electrically connected to the input module and has a traffic signal and sign recognition unit 21, an obstacle detection and analysis unit 22 and an eco-driving logic unit 23. The control module 20 receives image signals from the image-capturing unit 11 and the speed signals from the vehicle body signal capturing unit 12. The traffic signal and sign recognition unit 21 recognizes a speed limit and traffic lights of the current road. The obstacle detection and analysis unit 22 recognizes if there is any obstacle on the lane ahead of the vehicle, which can cause obstruction upon driving. The eco-driving logic unit 23 determines a current vehicle speed according to the road or environmental limits acquired from the traffic signal and sign recognition unit 21 and the obstacle detection and analysis unit 22, a preset high-speed or low-speed driving mode and the at least one speed signal, and calculates and then provides multiple optimal eco-driving instructions matching the current road condition.

The output module 30 is electrically connected to the control module and has a display unit 31, a prompt unit 32 and an active control unit 33. The display unit 31 and the prompt unit 32 respectively serve to display or prompt the eco-driving instructions or driving limits on the road with voice. The active control unit 33 is electrically connected to the accelerator of the vehicle and a brake circuit. According to signals of the eco-driving instructions or the driving limits on the road outputted from the eco-driving logic unit 23, the active control unit 33 controls the accelerator and the brake of the vehicle to avoid increasing fuel consumption due to fast acceleration.

Figure 3:
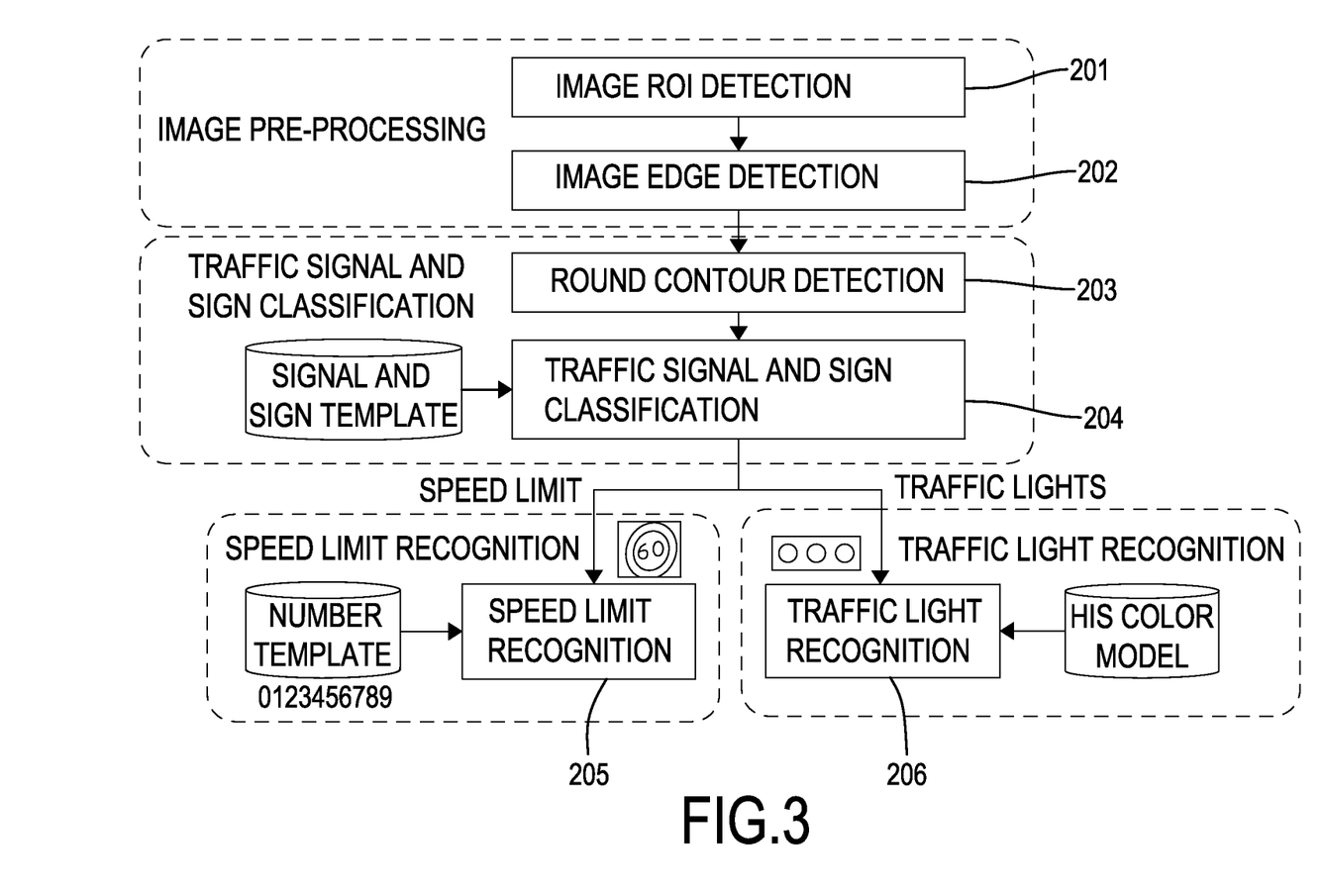
FIG. 3 is a flow diagram of operation of a traffic signal and sign recognition unit of the intuitive eco-driving assistance system in FIG. 2.

The method by which the traffic signal and sign recognition unit 21 recognizes current speed limit and traffic light of the road includes but is not limited to the following processing steps. For example, speed limits on the road can be acquired from the GPS technique. With reference to FIG. 3, the traffic signal and sign recognition unit 21 recognizes a speed limit and a traffic light according to the image signals of the road and environmental conditions ahead of the vehicle, and its processing steps has an image ROI (Region of Interest) detection step (201), an image edge detection step (202), a round contour detection step (203) and a traffic signal and sign classification step (204), a speed limit recognition step (205) and a traffic light recognition step (206). The image ROI detection step (201) and the image edge detection step (202) serve to detect images of the road and environmental conditions ahead of the vehicle and to recognize traffic signals and signs of the road. The traffic signals and signs indicate the traffic signs with speed limits and the traffic lights. The round contour detection step (203) focuses on the detection of the acquired speed limit signs and a round contour of the speed limit signs as the speed limit signs usually have a round contour. The traffic signal and sign classification step (204) connects to a classification template having the traffic signals and signs, and classifies the images of the speed limit signs and the traffic lights. The speed limit recognition step (205) captures the highest speed limit on a corresponding speed limit sign after the image of the speed limit sign is screened out. The traffic light recognition step (206) recognizes the state of a corresponding traffic light through a HIS (Hue Intensity Saturation) color model after the image of the traffic light is screened out.

Figure 4:
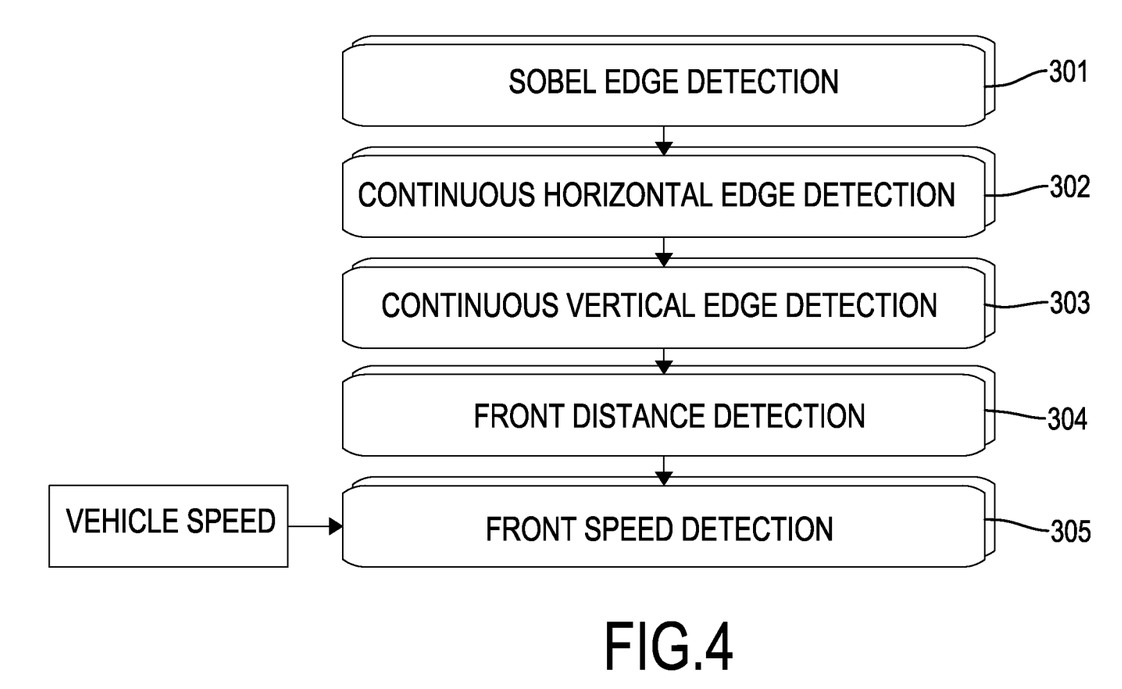
FIG. 4 is a flow diagram of operation of an obstacle detection and analysis unit of the intuitive eco-driving assistance system in FIG. 2.

In the present embodiment, the method by which the obstacle detection and analysis unit 22 recognizes if there is any obstacle ahead of the vehicle causing obstruction upon driving includes but is not limited to the following processing steps. For example, obstacles ahead of the vehicle can be identified through radar or ultrasonic detection. With reference to FIG. 4, the obstacle detection and analysis unit 22 detects if there is any obstacle according to the image signals of the road and environmental conditions ahead of the vehicle, and if positive, measures the number, distance and speed of the obstacle, and its processing steps have a Sobel edge detection step (301), a continuous horizontal edge detection step (302), a continuous vertical edge detection step (303), a front distance detection step (304) and a front speed detection step (305). The Sobel edge detection step (301), the continuous horizontal edge detection step (302) and the continuous vertical edge detection step (303) serve to identify the position of an obstacle in the front. The front distance detection step (304) and the front speed detection step (305) serve to identify the distance and speed of the obstacle in the front. The front speed detection step (305) serves to connect with a vehicle speed signal and calculate a relative speed between the obstacle and the vehicle.

Figure 5:
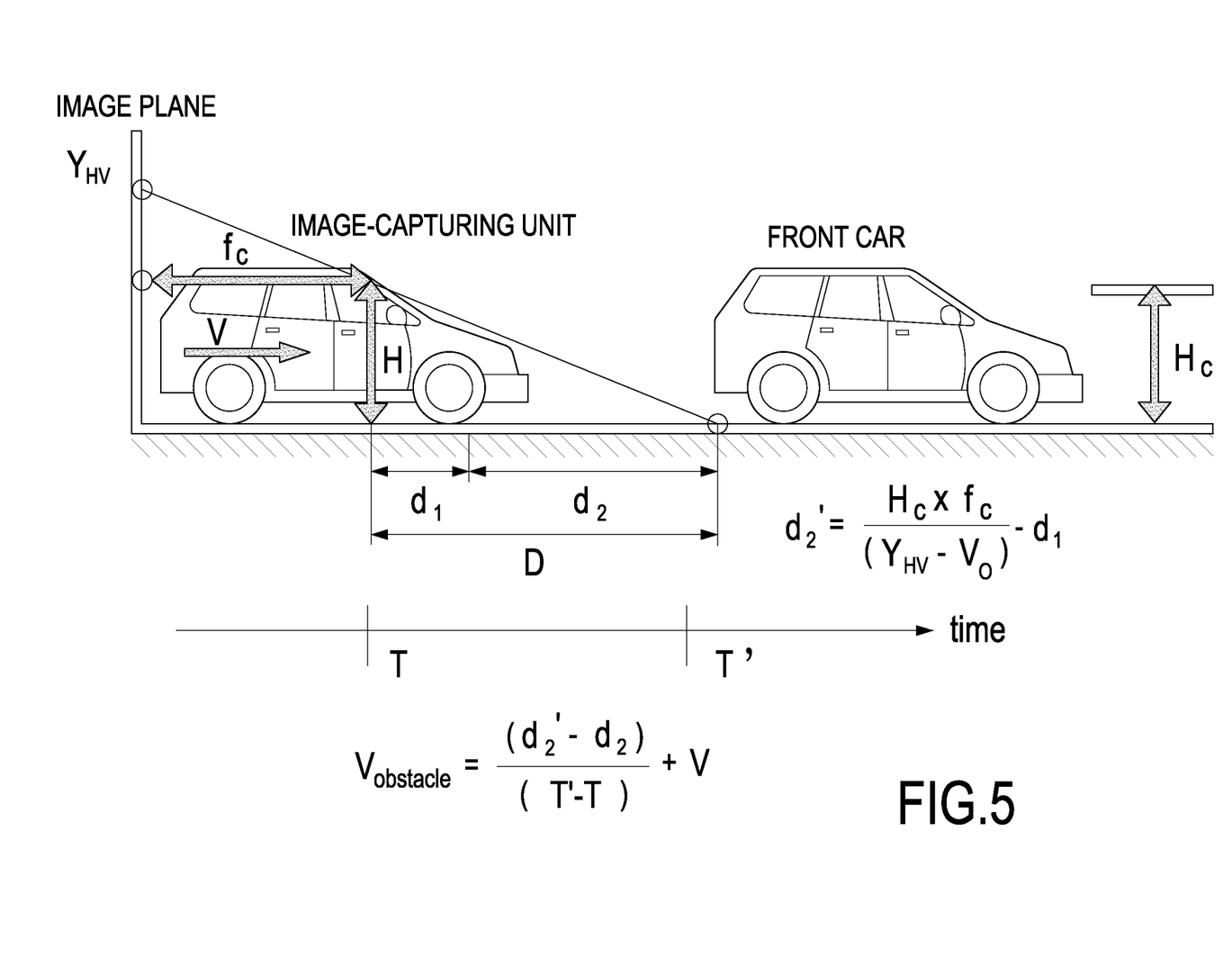
FIG. 5 is an operational schematic diagram of the obstacle detection and analysis unit of the intuitive eco-driving assistance system in FIG. 2.

With reference to FIG. 5, a distance between the vehicle and a preceding vehicle (an obstacle) ahead of the vehicle can be calculated by $$d'_2 = \frac{H_C \times f_C}{Y_{HV} - V_0} - d_1,$$

and the speed of the preceding vehicle is equal to $$V_{obstacle} = \frac{d'_2 - d_2}{T' - T} + V,$$

where $H_C$ is the height of mounted camera from the ground $f_C$ is the focal length of camera; $Y_{HV}$ is the coordinate of image in row direction of the preceding vehicle bottom end point, $V_0$ is half of the height of image in row direction, d1 is the distance from the camera to the front tip of host vehicle, D is the distance between the host camera and the tail of preceding vehicle, d2 is the headway between two cars, and T' is a sampling time of next image frame, and V is a speed of the vehicle.

Figure 6:
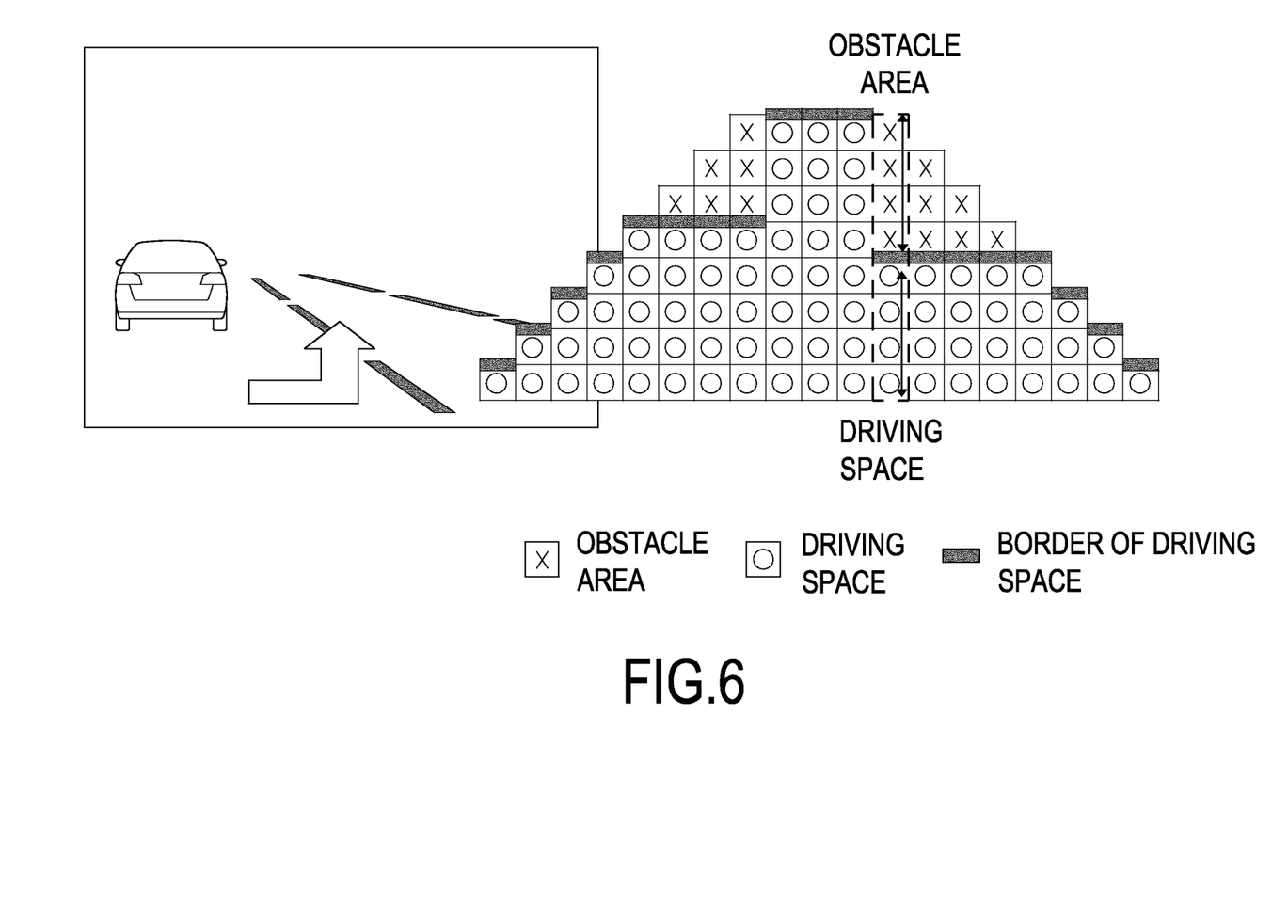
FIG. 6 is an operational schematic diagram of the intuitive eco-driving assistance system in FIG. 2 upon detecting available space for driving.

After recognizing any obstacle on the lane ahead of the vehicle, the obstacle detection and analysis unit 22 further analyzes if there is available room ahead of the vehicle for driving for the purpose of providing a lane-changing prompt. With reference to FIG. 6, 'X', 'O' and '■' in FIG. 6 respectively represent an area with obstacle, a driving area, and a border of the driving area. An area on the top right indicates an area with obstacle and is isolated by the rectangular bars '■' as an area unavailable for driving. By acquiring the position and the distributed area of an obstacle, the obstacle detection and analysis unit 22 can estimate a driving area. Given a proportional relationship of a row coordinate on the image and a corresponding distance, an actual space corresponding to a column coordinate on the image can be calculated to ensure if there is enough space for lane changing.

Figure 7:
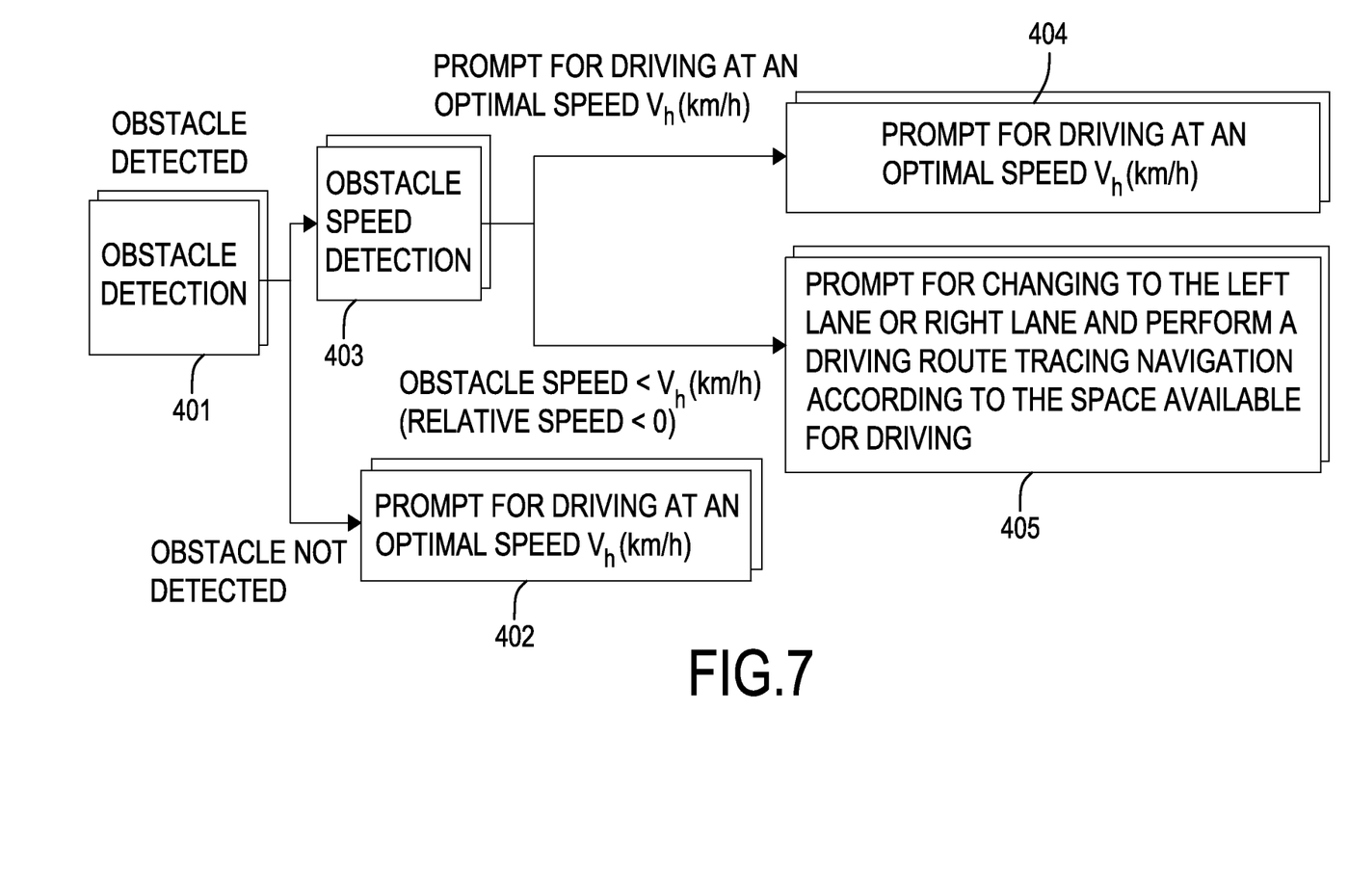
FIG. 7 is a flow diagram of the intuitive eco-driving assistance method in FIG. 1 in determining a high-speed driving mode.
Figure 8:
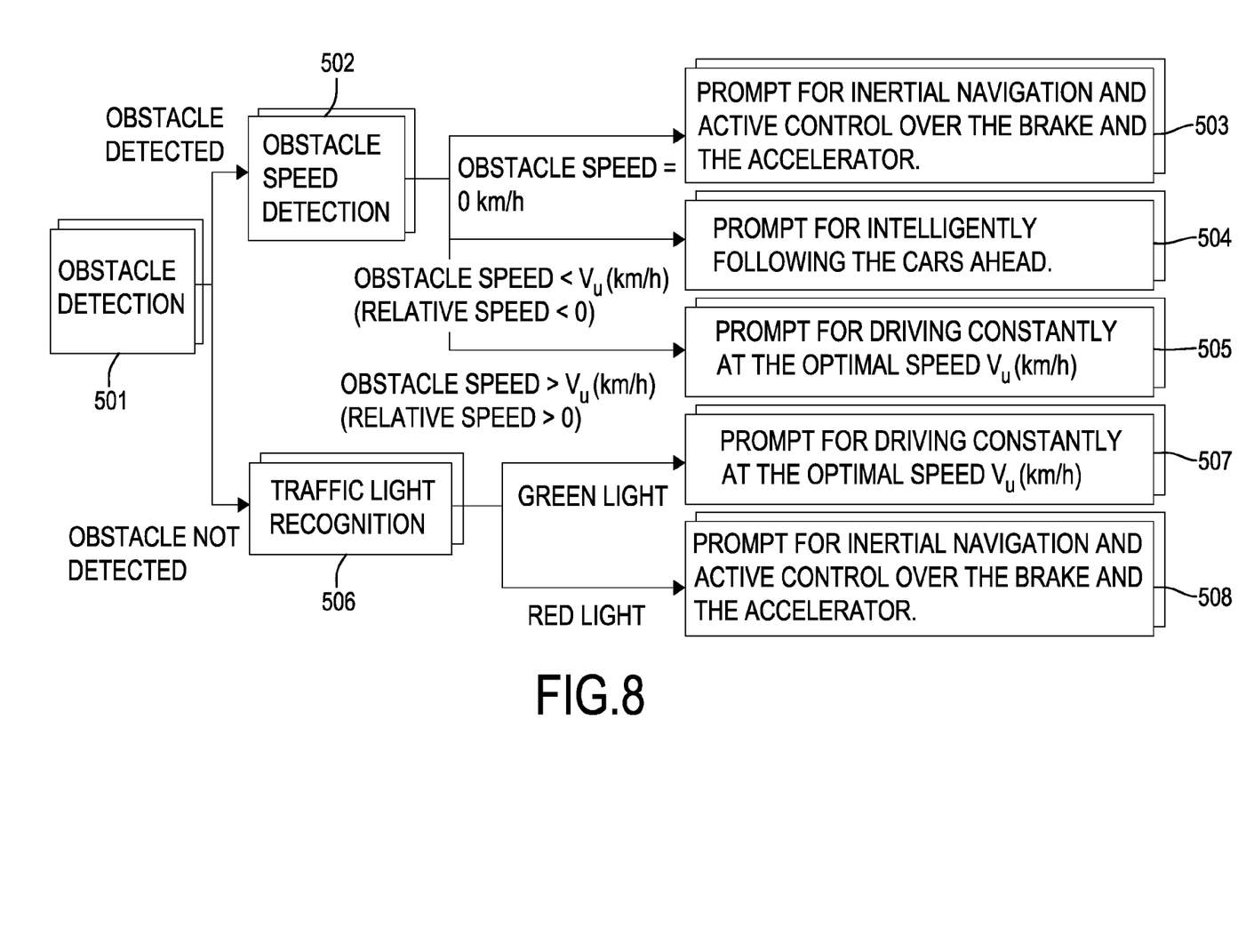
FIG. 8 is a flow diagram of the intuitive eco-driving assistance method in FIG. 1 in determining a low-speed driving mode.

With reference to FIGS. 7 and 8, the eco-driving logic unit 23 classifies driving speeds into a high-speed driving mode or a low-speed driving mode corresponding to a preset speed limit according to the driving limit of the road and environment conditions acquired from the traffic signal and sign recognition unit 21 and the obstacle detection and analysis unit 22, determines a current speed of the vehicle in collaboration with the speed signal, and calculates to provide multiple optimal eco-driving instructions matching current road condition. In the present embodiment, the preset speed limit is 60 kilometers/hour, and the suggested speeds of the optimal eco-driving are classified to be 50 kilometers/hour and 90 kilometers/hour. The preset speed limit is subject to change depending on the actual road condition.

The eco-driving logic unit 23 classifies driving speeds into two types, namely, a high-speed driving mode (fast road driving mode) and a low-speed driving mode (urban road driving mode). With reference to FIG. 7, the high-speed driving mode is performed by the eco-driving logic unit 23 according to the distance and speed of an obstacle and a driving area between the obstacle ahead and the vehicle to provide optimal eco-driving instructions, such as lane change, gentle starting, and intelligent car-following and cruise control, in compliance with current road condition. With reference to FIG. 8, the low-speed driving mode is performed by the eco-driving logic unit 23 according to the distance and speed of an obstacle ahead and a recognition result of traffic signals and lights to provide optimal eco-driving instructions, such as inertial navigation, gradual and smooth start of the vehicle, and intelligent car-following and cruise control, in compliance with current road condition. The optimal eco-driving instructions generated by the eco-driving logic unit 23 can be converted into control signals that are outputted to the active control unit 33 of the output module 30. The active control unit 33 controls the accelerator and the brake of the vehicle according to the control signals.

With reference to FIG. 7, the procedures of determining the high-speed driving mode in the intuitive eco-driving assistance method have the following steps.

Step 401: Detect if there is any obstacle ahead of the vehicle through the obstacle detection and analysis unit 22 of the control module 20.

Step 402: If no obstacle is found, provide an eco-driving instruction for "driving at an optimal speed $V_h$ kilometers/hour during the high-speed driving mode".

Step 403: If an obstacle is found, detect a speed of the obstacle.

Step 404: If the speed of the obstacle is faster than the optimal speed $V_h$ or a relative speed is greater than zero, provide an eco-driving instruction for "driving at the optimal speed $V_h$ during the high-speed driving mode".

Step 405: If the speed of the obstacle is slower than the optimal speed $V_h$ or a relative speed is less than zero, provide an eco-driving instruction for "changing to the left lane or right lane and performing a driving route tracing navigation" according to the space available for driving calculated from the obstacle detection and analysis unit 22 or an eco-driving instruction for actively and intelligently following cars ahead. Preferably, the optimal speed $V_h$ is set to be 90 kilometers/hour.

Figure 9:
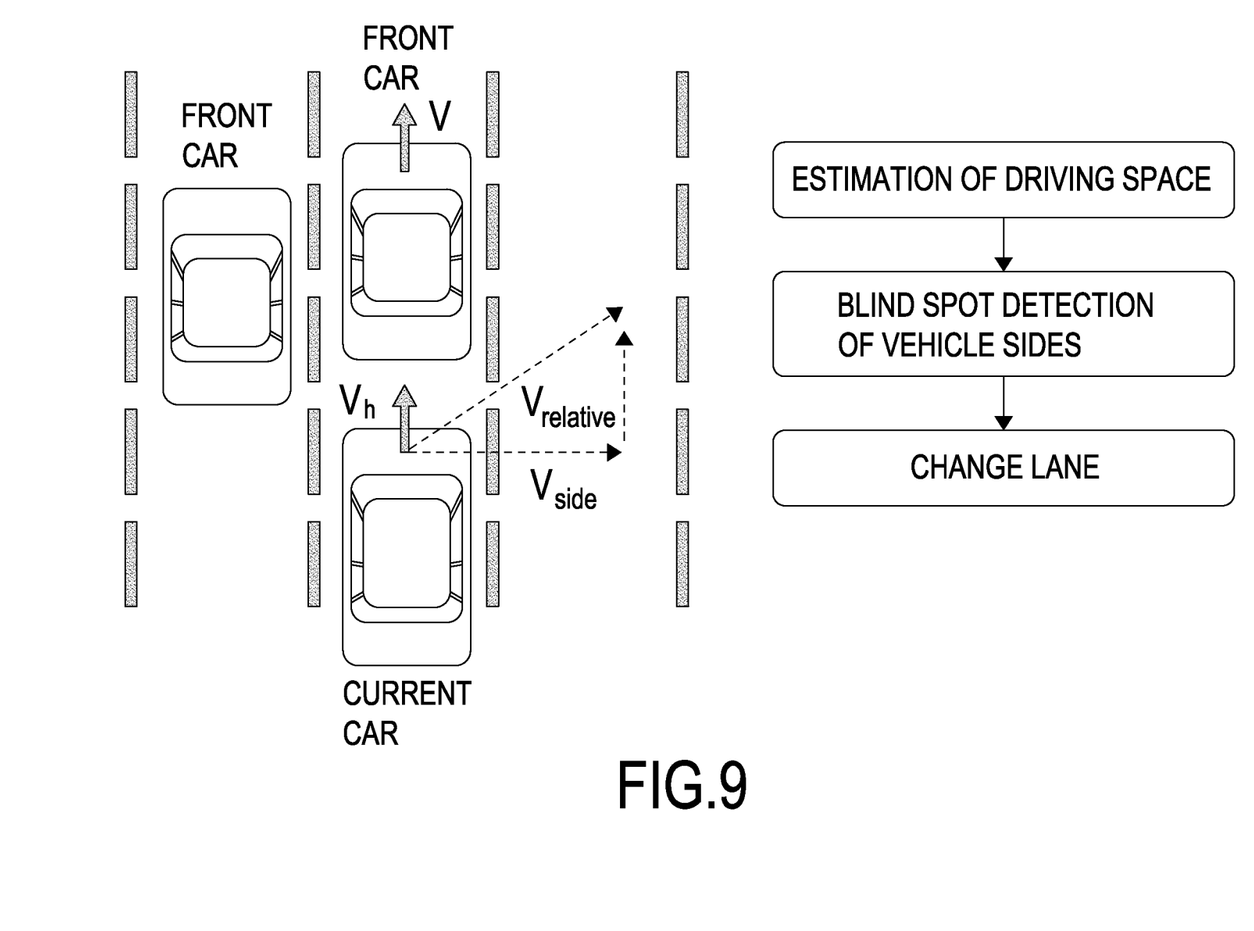
FIG. 9 is a flow diagram of the intuitive eco-driving assistance method in FIG. 1 in performing a lane-changing operation.

With reference to FIG. 9, to confirm if there is any space available for driving, the foregoing lane-changing instruction must be collaborated with steps of performing estimation of driving space to ensure there is enough space for lane changing, then performing a blind spot detection of vehicle sides for detecting if there is any vehicle by observing from a video-recording unit mounted on a vehicle side, and generating a prompt for changing lane when there is no vehicle found. Regulated by ISO, a maximum lateral speed is 1.5 m/s, and a lateral lane-changing distance is equal to the lane width $W_{lane}$=4 m. As suggested by SAE2400, a front safe distance is 1.18S×$V_h$. Hence, a longitudinal safe distance for driving is $$D_{relative} = \left(\frac{W_{lane}}{V_{side}}\right) \times V_{relative},$$

and a driving space $D_{safe}$ is $D_{safe}$=$D_{relative}$+1.18S×$V_h$. A prompt for changing lane is provided only when the calculated driving space $D_{safe}$ meets the conditions required for changing lane.

With reference to FIG. 8, the procedures of determining the low-speed driving mode in the intuitive eco-driving assistance method have the following steps.

Step 501: Detect if there is any obstacle ahead of the vehicle through the obstacle detection and analysis unit 22 of the control module 20.

Step 502: If there is an obstacle, detect the speed of the obstacle.

Step 503: If the speed of the obstacle is equal to 0 kilometer/hour, provide an eco-driving instruction for "inertial navigation" and active control over the brake and the accelerator.

Step 504: If the speed of the obstacle is slower than the optimal speed $V_u$ or a relative speed is less than zero, provide an eco-driving instruction for actively and intelligently following the vehicles ahead.

Step 505: If the speed of the obstacle is faster than the optimal speed $V_u$, and a distance to the obstacle is greater than the safe distance or the relative speed is greater than zero, provide an eco-driving instruction for "driving constantly at the optimal speed $V_u$".

Step 506: If no obstacle is found ahead of the vehicle, perform detection of traffic signals (traffic lights).

Step 507: If a green light shows, provide an eco-driving instruction for "driving constantly at the optimal speed $V_u$".

Step 508: If a red light shows, provide an eco-driving instruction for "inertial navigation" and active control over the brake and the accelerator.

If the traffic light changes from the red light to the green light, then provide an eco-driving instruction for "gentle starting" to avoid more fuel consumption arising from quick acceleration. Preferably, the optimal speed $V_u$ is set to 50 kilometers/hour.

Figure 10:
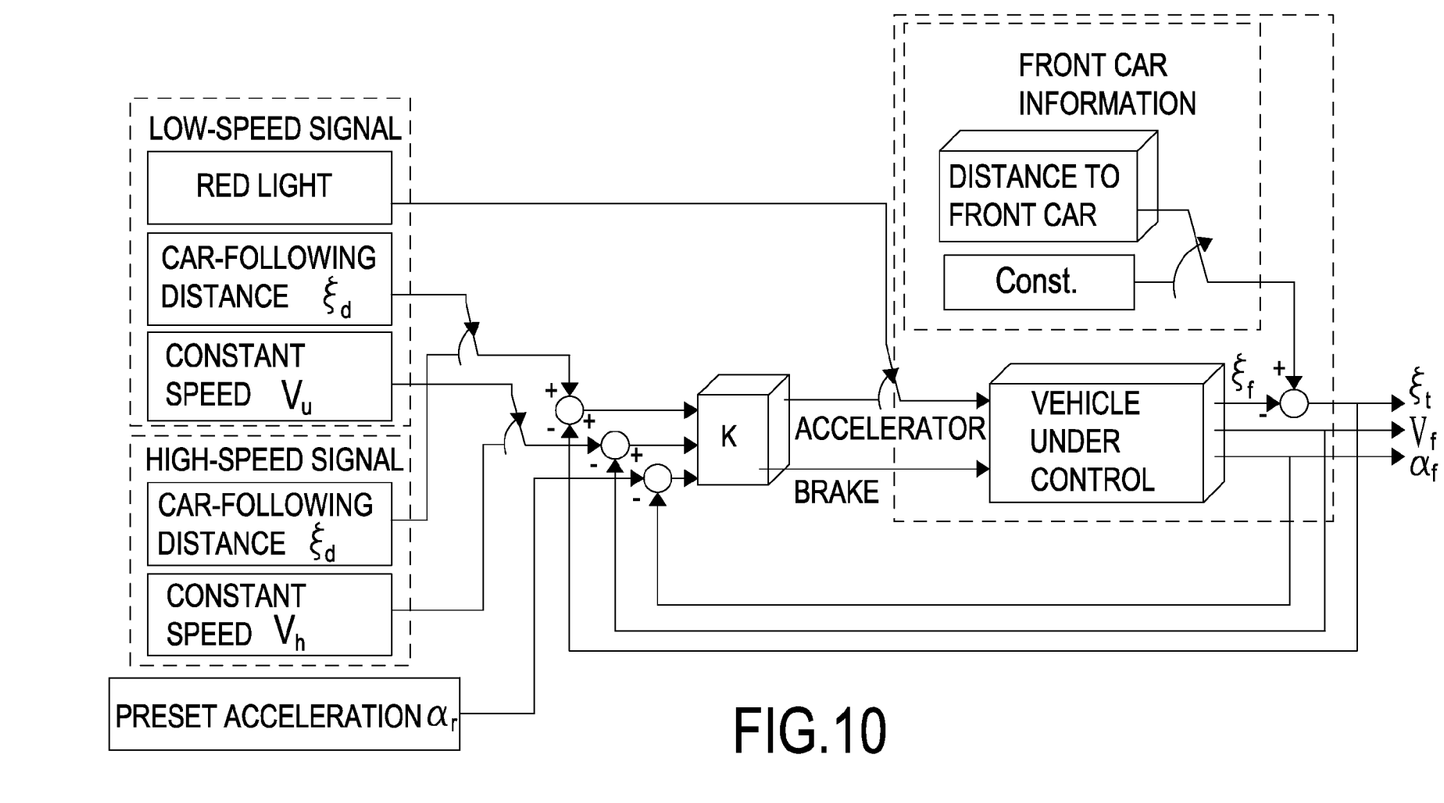
FIG. 10 is a feedback loop diagram illustrating signals of a fuel-saving driving logic unit of the intuitive eco-driving assistance system in FIG. 2.
Figure 11:
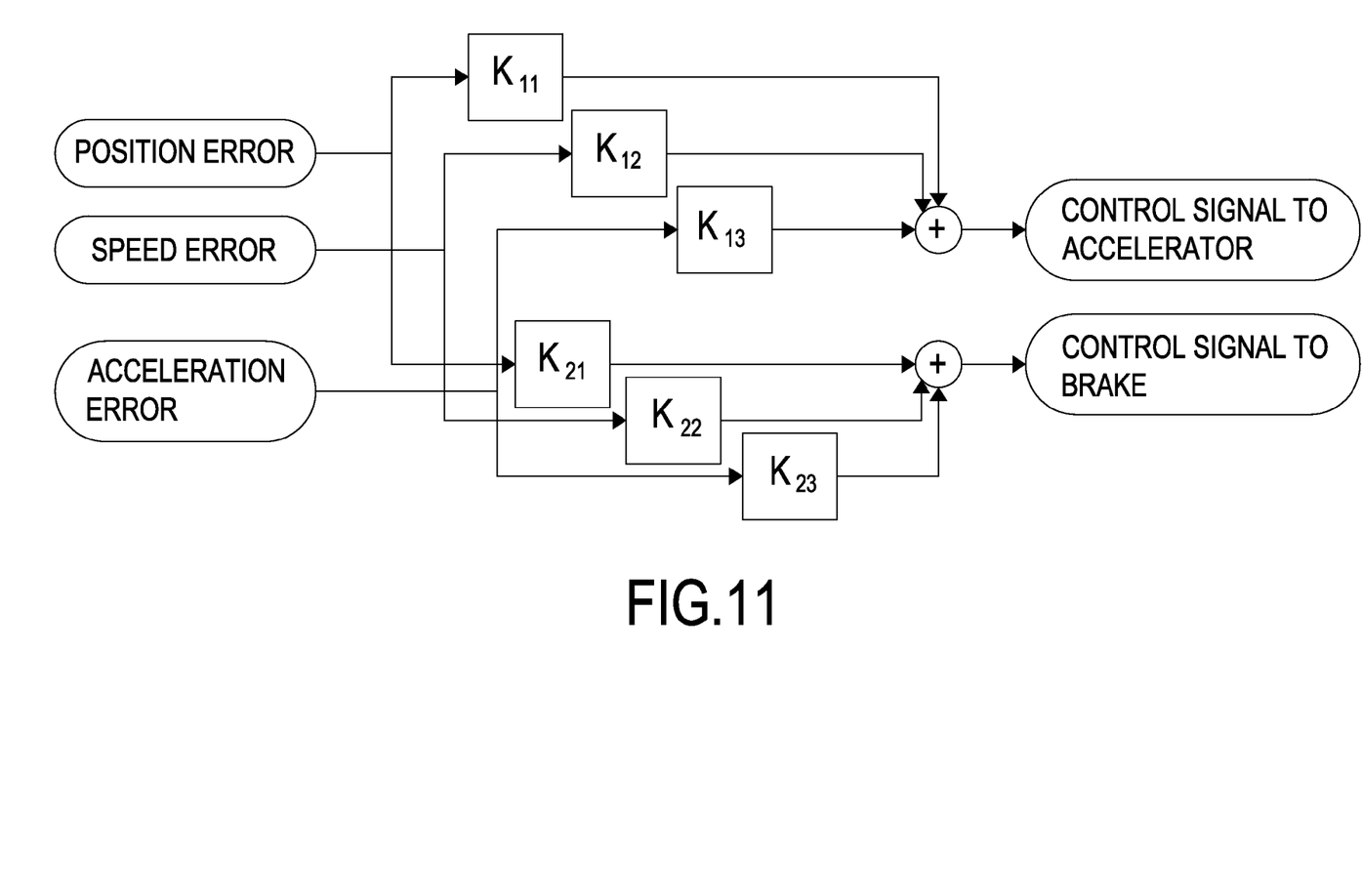
FIG. 11 is another feedback loop diagram illustrating signals of the fuel-saving driving logic unit FIG. 2 with control gains.

With reference to FIGS. 10 and 11, the eco-driving logic unit 23 receives a position error signal, a speed error signal and an acceleration error signal, magnifies them with corresponding gains and adds the magnified signals together to respectively output two control signals to the accelerator and the brake. The position error signal is generated by selecting a car-following distance $\xi_d$ corresponding to the fast-speed driving mode or the low-speed driving mode and adding an outputted relative distance between vehicles $\xi_t$ to the car-following distance $\xi_d$ through a negative feedback. The speed error signal is generated by selecting the optimal speed $V_u$ or $V_h$ corresponding to the fast-speed driving mode or the low-speed driving mode and adding an outputted speed $V_f$ to the optimal speed $V_u$ or $V_h$ through a negative feedback. The acceleration error signal is generated by adding an outputted acceleration $a_f$ to a preset acceleration $a_r$ through a negative feedback.

In the present embodiment, the control gain K of the eco-driving logic unit 23 is obtained by using linear quadratic regulator (LQR), which can be expressed by K=−$R^{-1}B^TX$, where R is an input parameter, B is an output, and X=$\int_0^\infty e^{(A+BK)^Tt}(Q+K^TRK)e^{(A+BK)t}dt$. The control gain K is a 2×3 matrix, and the elements of the matrix are $K_{11}$, $K_{12}$, $K_{13}$, $K_{21}$, $K_{22}$ and $K_{23}$, in which $K_{11}$, $K_{12}$ and $K_{13}$ respectively correspond to the position error signal, the speed error signal and the acceleration error signal and target at generating the control signal to the accelerator, and $K_{21}$, $K_{22}$ and $K_{23}$ respectively correspond to the position error signal, the speed error signal and the acceleration error signal and target at generating the control signal to the brake.

From the foregoing, by acquiring images of the road and environmental conditions ahead of the vehicle, recognizing the traffic signals and signs on the images, detecting if there is any obstacle ahead of the vehicle, and adding the optimal conditions for eco-driving behaviors, the optimal eco-driving instructions and active control over the vehicle matching current road condition can be provided without using additional and complicated system, thereby solving the issue of conventional vehicles being structurally complicated and costly for conserving energy and only passively prompting fuel consumption. Additionally, the drawback of consuming more fuel as failing to instantly respond to road conditions and to adjust driving behaviors of drivers beforehand can be also resolved.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An intuitive eco-driving assistance method, comprising steps of:
    acquiring images of road and environmental conditions ahead of a vehicle;
    recognizing traffic signs and signals on the images;
    detecting any obstacle ahead of the vehicle and analyzing the obstacle;
    converting the traffic signs and signals and an analyzed information of the obstacle into at least one mode of eco-driving behavior, wherein the at least one mode of eco-driving behavior includes a high-speed driving mode prompting multiple optimal eco-driving instructions for lane changing, intelligent car-following and cruise control in compliance with the road and environmental conditions according to a distance and a speed of the obstacle ahead of the vehicle and a driving area between the obstacle and the vehicle; and
    generating a prompt message corresponding to the mode of eco-driving behavior.

2. The method as claimed in claim 1, wherein
    the optimal eco-driving instruction for cruise control is prompted during the high-speed driving mode, if no obstacle is detected or if an obstacle is detected and the speed of the obstacle is faster than an optimal speed and a speed of the obstacle relative to the vehicle is greater than zero, wherein, the optimal eco-driving instruction for cruise control includes: driving constantly at the optimal speed; and
    the optimal eco-driving instruction is prompted for lane changing or intelligent car-following, if an obstacle is detected and the speed of the obstacle is slower than the optimal speed and the speed of the obstacle relative to the vehicle is less than zero, wherein the optimal eco-driving instruction for lane changing includes: changing lane and performing a driving route tracing navigation, and the optimal eco-driving instruction for intelligent car-following includes: actively and intelligently following vehicles ahead.

3. The method as claimed in claim 1, wherein the at least one mode of eco-driving behavior includes a low-speed driving mode prompting for multiple optimal eco-driving instructions for inertial navigation, gentle starting, and intelligent car-following and cruise control in compliance with the road and environmental conditions according to the distance and the speed of the obstacle ahead of the vehicle and a recognition result of traffic signals and signs.

4. The method as claimed in claim 3, wherein
    the optimal eco-driving instruction for inertial navigation is prompted during the low-speed driving mode, if an obstacle is detected and the speed of the obstacle is equal to 0 kilometer/hour or if no obstacle is detected and a red light shows, wherein the optimal eco-driving instruction for inertial navigation includes: performing an inertial navigation;
    the eco-driving instruction for intelligently following the vehicles ahead is prompted, if an obstacle is detected and the speed of the obstacle is slower than an optimal speed and a speed of the obstacle relative to the vehicle is less than zero, wherein the optimal eco-driving instruction for inertial navigation includes: actively and intelligently following vehicles ahead;
    the eco-driving instruction for cruise control is prompted, if an obstacle is detected and the speed of the obstacle is faster than the optimal speed, the distance to the obstacle is greater than a safe distance and the speed of the obstacle relative to the vehicle is greater than zero or if no obstacle is detected and a green light shows, wherein the optimal eco-driving instruction for cruise control includes: driving constantly at the optimal speed; and
    the optimal eco-driving instruction for gentle starting is prompted, if no obstacle is detected and the traffic light changes from the red light to the green light, wherein the eco-driving instruction for gentle starting includes: gently starting the vehicle.

5. An intuitive eco-driving assistance system, comprising:
    an input module having:
        an image-capturing unit taking images of roads and environmental conditions ahead of a vehicle and outputting image signals; and
        a vehicle body signal capturing unit adapted to acquire at least one speed signal of the vehicle;
    a control module electrically connected to the input module, receiving the image signals from the image-capturing unit and the at least one speed signal from the vehicle body signal capturing unit, and having:
        a traffic signal and sign recognition unit recognizing a speed limit and traffic lights of the roads and environmental conditions;
        an obstacle detection and analysis unit detecting information of any obstacle ahead of the vehicle; and
        an eco-driving logic unit prompting multiple optimal eco-driving instructions according to the at least one speed signal, the speed limit and the detected information of obstacle acquired from the traffic signal and sign recognition unit and the obstacle detection and analysis unit, and at least one mode of eco-driving behavior preset in the eco-driving logic unit and corresponding to the speed limit and the detected information of the obstacle,
    wherein the at least one mode of eco-driving behavior includes a high-speed driving mode prompting the multiple optimal eco-driving instructions for lane changing, intelligent car-following and cruise control in compliance with the road and environmental conditions according to a distance and a speed of the obstacle ahead of the vehicle and a driving area between the obstacle and the vehicle, wherein the optimal eco-driving instruction for cruise control is prompted during the high-speed driving mode if no obstacle is detected or if an obstacle is detected and the speed of the obstacle is faster than an optimal speed and a speed of the obstacle relative to the vehicle is greater than zero, and includes driving constantly at the optimal speed, the optimal eco-driving instruction for lane changing or intelligent car-following is prompted if an obstacle is detected and the speed of the obstacle is slower than the optimal speed and the speed of the obstacle relative to the vehicle is less than zero, the optimal eco-driving instruction for lane changing includes: changing lane and performing a driving route tracing navigation, and the optimal eco-driving instruction for intelligent car-following includes: actively and intelligently following vehicles ahead; and an output module electrically connected to the control module and having a display unit and a prompt unit respectively serving to display and prompt the eco-driving instructions or the speed limit with voice.

6. The system as claimed in claim 5, wherein the output module further has an active control unit adapted to electrically connect to an accelerator and a brake circuit of the vehicle.

7. The system as claimed in claim 5, wherein the at least one mode of eco-driving behavior includes a low-speed driving mode prompting for multiple optimal eco-driving instructions for inertial navigation, gentle starting, and intelligent car-following and cruise control in compliance with the road and environmental conditions according to the distance and the speed of the obstacle ahead and a recognition result of traffic signals and signs;

the optimal eco-driving instruction for inertial navigation is prompted during the high-speed driving mode, if an obstacle is detected and the speed of the obstacle is equal to 0 kilometer/hour or if no obstacle is detected and a red light shows, wherein the optimal eco-driving instruction for inertial navigation includes: performing an inertial navigation;

the eco-driving instruction for intelligently following the vehicles ahead is prompted, if an obstacle is detected and the speed of the obstacle is slower than the optimal speed and the speed of the obstacle relative to the vehicle is less than zero, wherein the optimal eco-driving instruction for inertial navigation includes: actively and intelligently following vehicles ahead;

the eco-driving instruction for cruise control is prompted, if an obstacle is detected and the speed of the obstacle is faster than the optimal speed, the distance to the obstacle is greater than a safe distance and the speed of the obstacle relative to the vehicle is greater than zero or if no obstacle is detected and a green light shows, wherein the optimal eco-driving instruction for cruise control includes: driving constantly at the optimal speed; and the optimal eco-driving instruction for gentle starting is prompted, if no obstacle is detected and the traffic light changes from the red light to the green light, wherein the eco-driving instruction for gentle starting includes: gently starting the vehicle.

8. The system as claimed in claim 6, wherein the at least one mode of eco-driving behavior includes a low-speed driving mode prompting for multiple optimal eco-driving instructions for inertial navigation, gentle starting, and intelligent car-following and cruise control in compliance with the road and environmental conditions according to the distance and the speed of the obstacle ahead and a recognition result of traffic signals and signs;

the optimal eco-driving instruction for inertial navigation is prompted during the high-speed driving mode, if an obstacle is detected and the speed of the obstacle is equal to 0 kilometer/hour or if no obstacle is detected and a red light shows, wherein the optimal eco-driving instruction for inertial navigation includes: performing an inertial navigation;

the eco-driving instruction for intelligently following the vehicles ahead is prompted, if an obstacle is detected and the speed of the obstacle is slower than the optimal speed and the speed of the obstacle relative to the vehicle is less than zero, wherein the optimal eco-driving instruction for inertial navigation includes: actively and intelligently following vehicles ahead;

the eco-driving instruction for cruise control is prompted, if an obstacle is detected and the speed of the obstacle is faster than the optimal speed, the distance to the obstacle is greater than a safe distance and the speed of the obstacle relative to the vehicle is greater than zero or if no obstacle is detected and a green light shows, wherein the optimal eco-driving instruction for cruise control includes: driving constantly at the optimal speed; and the optimal eco-driving instruction for gentle starting is prompted, if no obstacle is detected and the traffic light changes from the red light to the green light, wherein the eco-driving instruction for gentle starting includes: gently starting the vehicle.

\* \* \* \* \*